US012347414B2

(12) United States Patent
Gao

(10) Patent No.: US 12,347,414 B2
(45) Date of Patent: Jul. 1, 2025

(54) METHOD, APPARATUS, AND SYSTEMS FOR FIRE SUPPRESSION USING SOUND WAVES

(71) Applicant: Haoze Gao, Nashua, NH (US)

(72) Inventor: Haoze Gao, Nashua, NH (US)

( * ) Notice: Subject to any disclaimer, the term of this patent is extended or adjusted under 35 U.S.C. 154(b) by 594 days.

(21) Appl. No.: 16/845,061

(22) Filed: Apr. 9, 2020

(65) Prior Publication Data

US 2020/0327878 A1 Oct. 15, 2020

Related U.S. Application Data

(60) Provisional application No. 62/985,296, filed on Mar. 4, 2020, provisional application No. 62/831,920, filed on Apr. 10, 2019.

(51) Int. Cl.

| | |
|---|---|
| ***A62C 99/00*** | (2010.01) |
| ***A62C 3/02*** | (2006.01) |
| ***A62C 3/08*** | (2006.01) |
| ***G10K 11/18*** | (2006.01) |
| ***G10K 11/28*** | (2006.01) |

(52) U.S. Cl.

CPC ............ *G10K 11/28* (2013.01); *A62C 3/0228* (2013.01); *A62C 3/08* (2013.01); *A62C 99/009* (2013.01)

(58) Field of Classification Search

CPC ....... A62C 3/08; A62C 3/0229; A62C 99/009; G10K 11/28

See application file for complete search history.

(56) References Cited

U.S. PATENT DOCUMENTS 4,028,640 A 6/1977 Nakamura
5,307,516 A * 4/1994 Nomoto ................. H03H 2/001 333/201
5,899,685 A * 5/1999 Thigpen .................. F23Q 25/00 431/144

(Continued)

FOREIGN PATENT DOCUMENTS

EP 2882037 B1 5/2018
KR 10-2027714 B1 10/2019

(Continued)

OTHER PUBLICATIONS

Sheng-Dong Zhao, et al. "Continuously Tunable Acoustic Metasurface for Transmitted Wavefront Modulation," Institute of Engineering Mechanics, Beijing Jiaotong University, Beijing 100044; Received Mar. 11, 2018; revised manuscript received Sep. 14, 2018; published Nov. 29, 2018.

(Continued)

*Primary Examiner* — Joseph A Greenlund
(74) *Attorney, Agent, or Firm* — ArentFox Schiff LLP

(57) ABSTRACT

The present apparatus, method, and system utilize sound waves to suppress fires using metasurface lenses that can work in concert with detectors to amplify and optimize sound pressure level and thereby deprive a fire of needed oxygen. Metamaterial is utilized that manipulates the propagation of acoustic waves by its structural makeup rather than its interior chemical makeup, thereby adjusting the phasing of sound waves to form converging beams of constructive interference even after the waves exit the material, ultimately making long-range fire-extinguishing accomplishable.

15 Claims, 10 Drawing Sheets

(56) References Cited

U.S. PATENT DOCUMENTS 6,104,301 A * 8/2000 Golden .................. A62C 37/40 169/61
6,907,786 B1 * 6/2005 Gebhardt ............. A61B 5/0002 73/644
8,773,312 B1 * 7/2014 Diaz ........................ H01Q 1/38 343/700 MS
9,812,786 B2 11/2017 Foo
9,907,987 B1 * 3/2018 Hossameldin ..... A62C 99/0009
10,501,180 B2 * 12/2019 Yu ........................ A62C 3/0228
10,569,115 B2 * 2/2020 Tran ......................... A62C 3/00
10,873,812 B2 * 12/2020 Subramanian ....... G01N 29/221
11,167,160 B2 * 11/2021 Hart ....................... A62C 37/09
11,785,384 B2 * 10/2023 Subramanian ......... H04R 1/025 381/335
2004/0129434 A1 * 7/2004 Tan ........................ A62C 37/40 239/69
2005/0004457 A1 * 1/2005 Moilanen ............. A61B 8/0875 600/437
2006/0196681 A1 * 9/2006 Adiga .................... A62C 5/008 169/47
2007/0172801 A1 * 7/2007 Darois ................... G09B 19/00 434/226
2009/0090857 A1 * 4/2009 Sigman ............. G01N 30/7206 250/281
2010/0020999 A1 * 1/2010 Huang ..................... H04R 1/02 381/386
2010/0203460 A1 * 8/2010 Formigoni ............ F23C 99/003 431/2
2012/0308050 A1 * 12/2012 Botti ....................... H03F 3/181 381/120
2013/0287234 A1 * 10/2013 Kramer .................... H04R 1/26 381/307
2013/0312429 A1 * 11/2013 Greuet ...................... F25B 9/14 62/6
2015/0297930 A1 * 10/2015 Nikkarila ............... A62C 37/40 169/46
2016/0027427 A1 * 1/2016 Yang .................... G10K 11/172 181/286
2016/0044417 A1 * 2/2016 Clemen, Jr. ...... G10K 11/17873 381/152
2016/0337750 A1 * 11/2016 Louis ..................... H04R 1/403
2017/0064448 A1 * 3/2017 Kawamura .......... H04R 29/002
2017/0259098 A1 * 9/2017 Tran ......................... A62C 3/00
2017/0319882 A1 * 11/2017 Hart ....................... A62C 31/03
2018/0047259 A1 * 2/2018 Carter .................... G10K 15/00
2018/0286371 A1 * 10/2018 Davis ..................... G10K 11/04
2019/0099631 A1 * 4/2019 Hart ....................... A62C 31/28
2019/0100311 A1 * 4/2019 Yu ............................ A62C 3/02
2019/0364362 A1 * 11/2019 Subramanian ....... G01N 29/221
2020/0327878 A1 * 10/2020 Gao ....................... G10K 11/18
2022/0180853 A1 * 6/2022 Memoli ................. G10K 11/04
2024/0132341 A1 * 4/2024 Hardy .................... G01N 29/36

FOREIGN PATENT DOCUMENTS

WO 2010144170 A2 12/2010
WO 2017096261 A1 6/2017

OTHER PUBLICATIONS

International Search Report with Written Opinion received from PCT/US20/27751 dated Jul. 16, 2020.

* cited by examiner

METHOD, APPARATUS, AND SYSTEMS FOR FIRE SUPPRESSION USING SOUND WAVES

RELATED APPLICATIONS

Priority is claimed to U.S. Provisional Patent Application No. 62/831,920 filed on Apr. 10, 2019, and also U.S. Provisional Patent Application No. 62/985,296 filed on Mar. 4, 2020.

BACKGROUND

Fire was the pinnacle of discovery in the stone age, allowing humans to create new tools and even extend the life-span of humans. However, fires have become a destructive force today. In 2017 1,300,000 fires were reported in the United States. That same year, it was estimated that the fire departments of the USA had to respond to a call once every 24 seconds; 23 billion dollars were lost due to fire-damaged property. With 1.1 million reported burn injuries in just one year according to statistics from the US Department of Health, fire is one of the greatest threats to safety.

Fires produce intense levels of heat and can burn hotter than 2,000° Celsius. When amino acids in human bodies exceed just 98.6 degrees Fahrenheit, the proteins that they make up begin "unfolding" and can jumble in various manners. These alterations to the body drastically change cellular makeup and can make whole areas of tissues non-functional. These alterations can accelerate the rate at which mutations occur, potentially causing cancer and other illnesses or deformities. Fires pose these and many other dangers that are well known.

A few existing solutions for suppressing fires exist in the form of fire retardants, which are substances that inhibit fire and are not easily susceptible to fire. For example, Nomex is a flame-resistant fabric developed and sold by Dupont Incorporated. Alternatively, handheld fire extinguishers contain fire retardants or fire suppression agents, such as potassium carbonate, nitrogen foam, and $CO_2$. A problem with these forms of fire suppression is that they cannot extinguish every type of fire. Handheld fire extinguishers are rated for different "types" of fires; for example, a dry chemical fire extinguisher may work for an electrical fire, but could be useless or even potentially harmful to use against a grease fire.

Another problem is that fire-fighting chemicals/compounds are dangerous to use. Many of them have been linked to causing cancer. Asbestos, one of the most well-known fire-retardant materials, has been linked to the aggressive cancer mesothelioma. This cancer occurs due to microscopic, fibrous fragments of asbestos flaking off, which can be inhaled. These asbestos particles are invisible to the human eye, and crystallized fragments cause severe damage to the lung tissue of people, which can lead to irreparable DNA damage.

Likewise, sprinklers are not an adequate solution for extinguishing fires because they are expensive to install and very dirty. Sprinkler systems typically do not change the water that they use; this means that if a sprinkler system was not used for 10 years, the water had been sitting in the pipes for 10 years. Bacterial growth and mold growth is very common in the pipes, which can cause unsanitary conditions if the water is eventually dispensed into the room. These conditions can lead to sickness if the water is not cleaned up properly, and render the home potentially unlivable for many months. Sprinkler systems can also cause flooding in the building which is extremely costly.

None of the "traditional" (e.g. handheld fire extinguishers) solutions of putting out fires are automated. The sooner a fire is discovered the better; fires can spread extremely quickly in the right circumstances. Fires can move 6 MPH in forests, and 14 MPH in grasslands. In a home environment, it is possible that a whole house is engulfed in 30 minutes. By automating fire extinguishing, the prevention of catastrophic fires is achievable, and other parties such as firefighters do not have to risk their lives to extinguish a fire.

It is clear that new advancements in the fire extinguishing industry must be made to decrease the harm fire can bring on humans' safety. Current solutions are inefficient, put people at risk, damage the environment, and ultimately cannot keep people safe. In view of the growing environmental and economic repercussions that both fires and their agents of suppression create, an alternative fire extinguisher must be developed that is effective and addresses the above concerns.

Sound wave fire extinguishing has been a long-known technology. In order to extinguish a fire, at least one of the following three conditions must be met: (1) the fire must have no fuel for it to burn, e.g. nothing flammable such as wood; (2) there must be nothing that can start a fire, such as a spark or heat; and (3) the fire must be cut off from oxygen. From the three conditions above, sound extinguishes a fire by taking much of its oxygen away from a fire's surrounding environment by using low-frequency sound waves.

Sound waves are capable of creating a vacuum effect in the air because sound is a pressure wave. A pressure wave is composed of oscillations of high-pressure areas (compressions) and low-pressure areas (rarefactions). By decreasing the frequency of a wave such that the sizes of the rarefactions become larger, a vacuum is created. In this vacuum, the fire will not properly be able to access oxygen atoms from the air for oxidation to occur, forcing the fire to burn out.

In addition, because sound waves are a longitudinal wave, they vibrate back and forth quickly. This means that they can create a "molecular" wind that further separates the fire from its oxygen supply. Longitudinal waves also create a cooling effect by "stretching" the flame, which spreads the amount of energy that the fire has. This means that heat is more spread apart, contributing to the fire being extinguished faster. Additionally, the oscillations of the sound wave at certain frequencies can cancel out with the resonance of fires, further suppressing it.

The phenomenon that sound waves can extinguish fires was first described by scientists long ago; however, it has never been very successful in real-life applications due to the exponential decrease of sound pressure level (SPL) exhibited in acoustic waves as they travel through the air. As sound waves travel, they spread their energy across an ever-increasing distance, and energy is also lost as heat. For these reasons, extinguishing a fire at distances over a few feet has never been practical, as extremely costly and large speakers and amplifiers would need to be used.

Existing fire extinguishers that rely on the principle of sound wave fire suppression include but may not be limited to U.S. Pat. No. 10,569,115B2 (Methods and systems for disrupting phenomena with waves), WO2017096261A1 (Low pressure drop acoustic suppressor nozzle for inert gas discharge system), U.S. Pat. No. 10,501,180B2 (Multifunction firefighting infrasound, hailstone, plant pollination drone apparatus and method), and U.S. Pat. No. 9,907,987B1 (Systems and methods for sound waves fire extinguishers). Each of these has major drawbacks.

U.S. Pat. No. 10,569,115B2 outlines a fire extinguisher that utilizes collimators to manipulate sound waves that exit a transducer, allowing the waves to suppress fires. However, the sound waves that exit this collimator disperse and therefore are only effective when the device is positioned closely to the fire.

Patent WO2017096261A1 utilizes sound waves simply as a method to transfer fire extinguishing gases for the suppression of fires. However, it does not utilize the effects of sound waves to directly extinguish a fire.

U.S. Pat. No. 10,501,180B2 ignores the sound wave concentration apparatus and does not provide a method in which the sound wave SPL can be sustained by the time it reaches a fire.

U.S. Pat. No. 9,907,987B1 outlines solely the process by which sound wave fire extinguishers can operate. The operation system outlined by that patent requires "a plurality of sound wave fire extinguishers" leading to high costs in commercial applications. Additionally, the sensor technology emits "a predetermined sound at a predetermined frequency," minimizing its effect on different types and sizes of fires.

The properties of metamaterials, particularly labyrinthine metamaterials and metamaterial coils have been described in the past especially in academia writing, however the technology has never been extended to sound wave manipulation for sound wave fire extinguishers.

BRIEF SUMMARY OF THE INVENTION

The present invention provides the first practical realization of sound wave fire extinguishment, suppression, or containment through the technology named SAFE. This technology utilizes metasurface lenses, detection methods that optimize the extinguishing in real-time, and other inventive features of the sound wave fire extinguisher that can increase and control sound pressure level (SPL). This mission driven technology can keep people safe.

According to one embodiment of the invention, individual modules of SAFE consist of a speaker, a signal generator that generates low frequency tones, and an apparatus that amplifies the electrical signal of the signal generator. These modules can be paired with detection systems and metamaterials to increase the SPL of the sound emitted by the speaker at the fire.

A key part of the SAFE invention is the metamaterial. Of course the word metamaterial is derived from the Latin prefix meta, meaning above or beyond. The important properties of metamaterials derive from their newly designed structures, rather than from their base materials. The extraordinary properties of a metamaterial can enable them to manipulate the propagation of electromagnetic and acoustic waves by its structural makeup rather than its interior chemical makeup. This allows for the use of low-cost materials to create complex structures with stunning properties. Metamaterials can be designed to adjust the phasing of the sound waves, causing them to form converging beams of constructive interference even after they exit the material, ultimately making long-range fire-extinguishing accomplishable. The focusing effect created by metamaterials is analogous to the focal point created by a convex lens.

The location of the metamaterial's focal point can be altered with minimal mechanical movements, thus making the extinguisher continuously tunable. This allows for one SAFE module to protect an entire room from fires since the focal point can be sweeped throughout the room. The tunable metamaterial can be paired with a fire detection system and computer chip that tunes the metamaterial in real time, allowing for the extinguisher to operate optimally.

DESCRIPTION OF DRAWINGS

All drawings are drawn using ASME Standards.

DETAILED DESCRIPTION

A detailed description of particular embodiments of the present invention (hereinafter called "SAFE") will now be provided, without limiting the larger scope of the claimed invention, and without ruling out any other embodiments of the claimed invention. A first embodiment of the invention consists of a speaker, a signal generator that generates low frequency tones, and an apparatus that amplifies the electrical signal of the signal generator.

Figure 1:
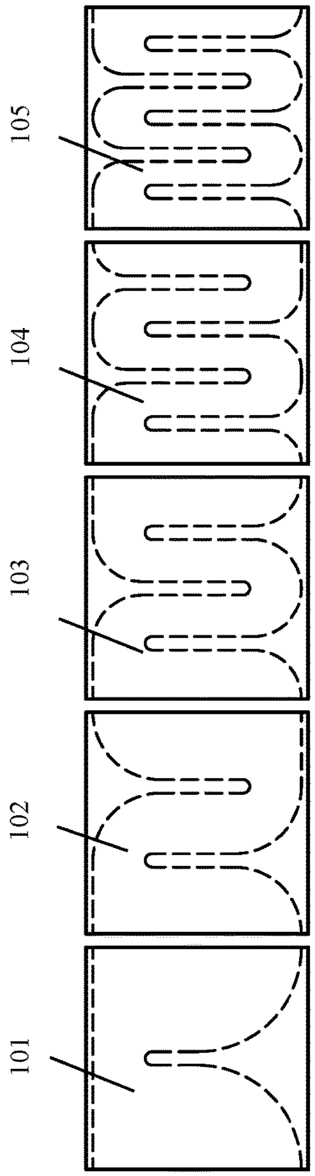
FIG. 1 depicts five labyrinthine metamaterial cells each with 1, 2, 3, 4, and 5, prongs from left to right.
Figure 2:
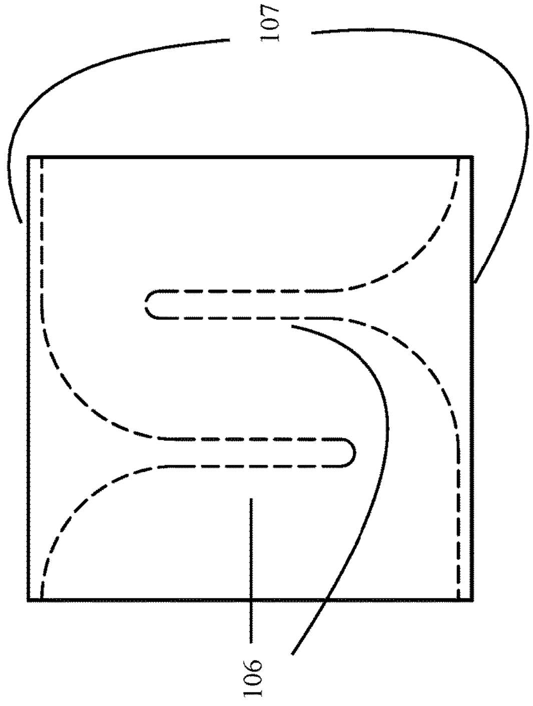
FIG. 2 is an enlarged view of the second metamaterial cell from the left of FIG. 1.
Figure 3:
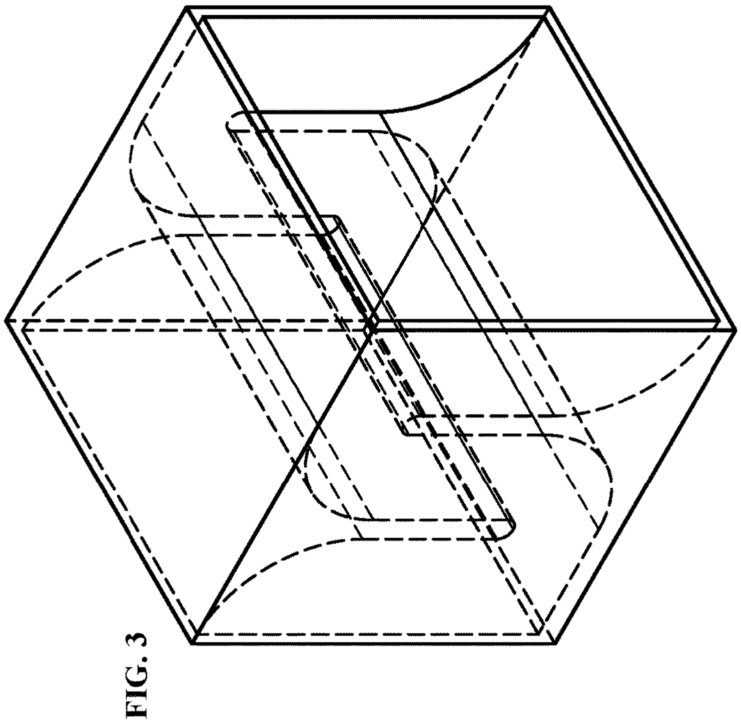
FIG. 3 is a perspective view from the corner of the metamaterial cell depicted in FIG. 2.

Labyrinthine metamaterial cells as illustrated in FIG. 1, FIG. 2, and FIG. 3 which depict 5 different cells, ordered left to right with increasing phase shift. Cell one is 101, cell two 102, cell 3 103, cell 4 104, and cell 5 105. Each cell is able to generate the phase shift since the prongs, 106, force sound waves to propagate around it. Each also comprises four walls, 107, that prevent the phase shift of the particular cell from mixing with another cell.

Using multiple labyrinthine metamaterial cells, a metamaterial lens can be created that sustains the dB of sound waves when they travel in air toward a fire, ultimately extinguishing it.

Figure 4:
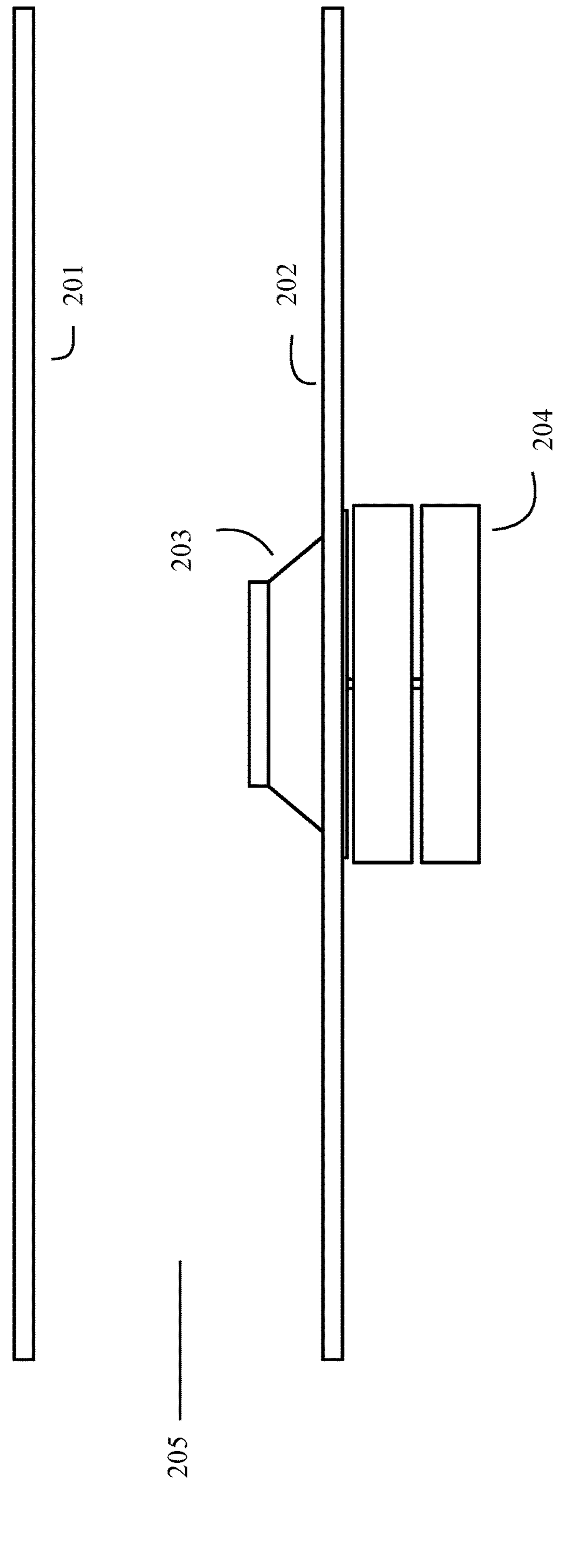
FIG. 4 is a cross section of a ceiling depicting the space below the ceiling and also the space above the ceiling and between the roof or floor above.
Figure 8:
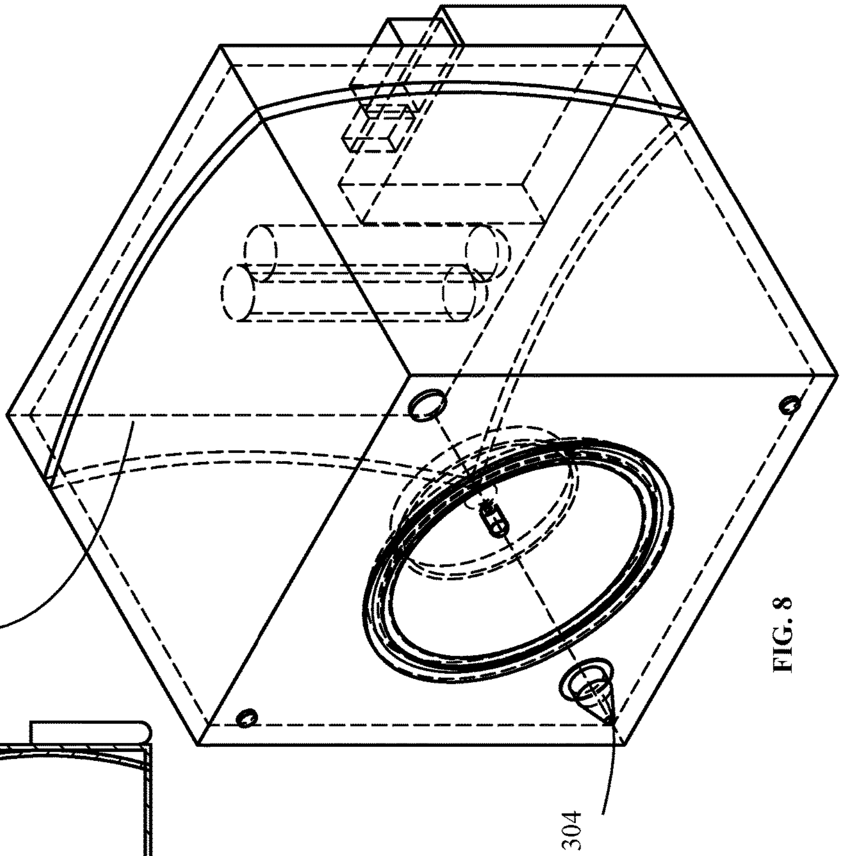
FIG. 8 is a perspective view of the sealed speaker box.
Figure 6:
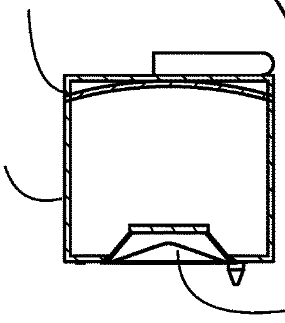
FIG. 6 is a cross section of FIG. 5 on line A-A, highlighting the parabolic reflector inside the chamber.
Figure 5:
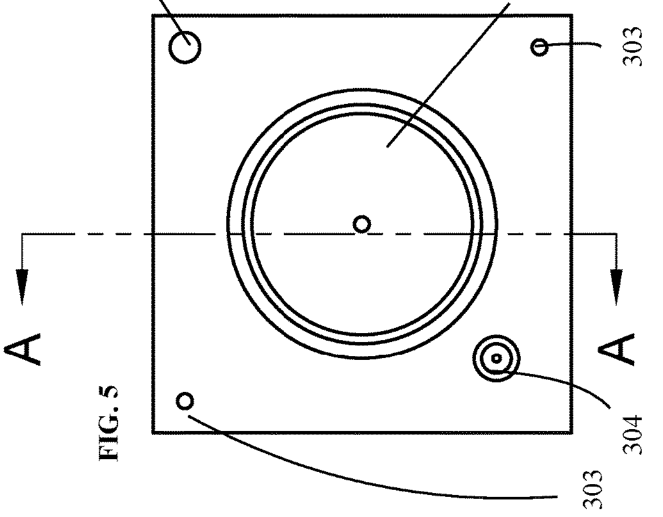
FIG. 5 depicts a sealed speaker box with two cameras, a smoke detector, a nozze, and a speaker.
Figure 7:
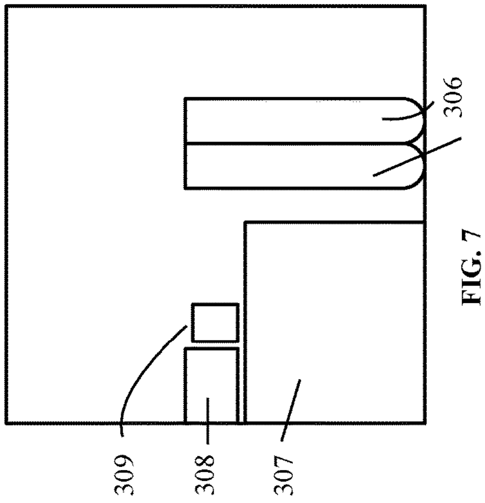
FIG. 7 is the rear of the sealed speaker box with pressurized canisters, an amplifier, signal generator, and microcontroller.
Figure 12:
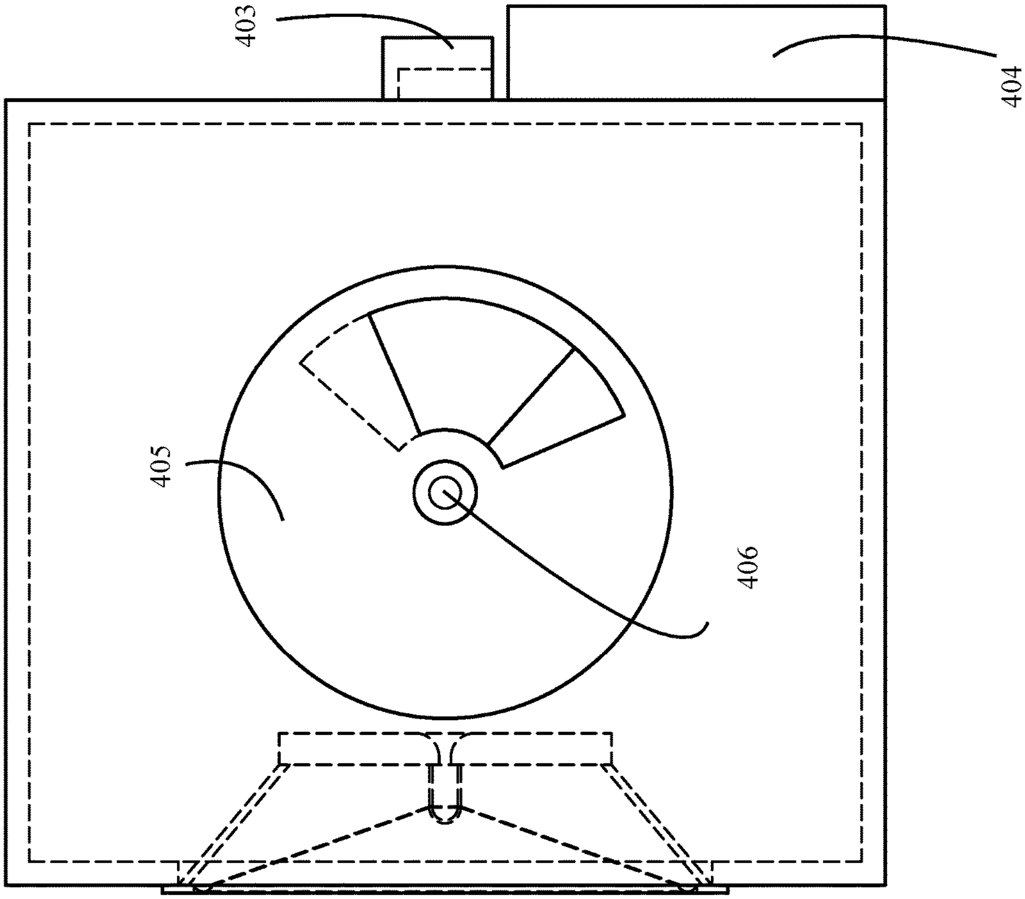
FIG. 12 depicts the side of the speaker box highlighting the speaker rotating plate of the pressure enhancer.
Figure 9:
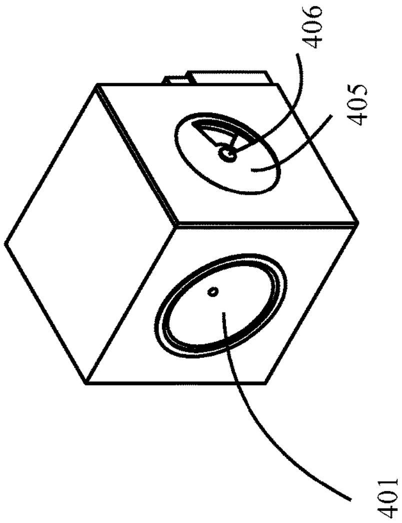
FIG. 9 depicts a speaker box with a pressure enhancer.
Figure 10:
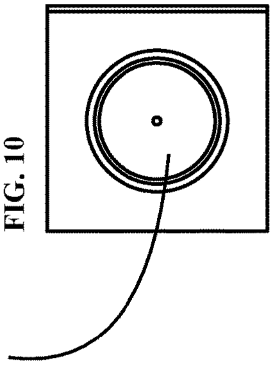
FIG. 10 depicts the front of the speaker box with the speaker.
Figure 11:
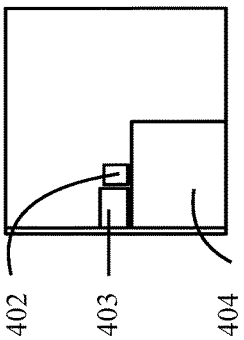
FIG. 11 depicts the rear of the speaker box with an amplifier, microcontroller, and signal generator.

These metamaterial lenses can be placed in the ceiling as depicted in FIG. 4 where the upper layer of the ceiling is 201 and the lower layer of ceiling is 202. Sound waves traveling from the speaker, 203, are focused by the tunable metamaterial plate, 204. The space between the two layers of the ceiling found in almost all homes, 205, acts as a speaker chamber that allows for the reverberation of sound waves.

To increase the sound pressure level (SPL) of the sound waves measured in dB, speaker boxes can also be used. FIG. 5, FIG. 6, FIG. 7, and FIG. 8 depict a sealed speaker box casing, 310, that does not allow air to travel in and out of the box. Small leakages are fine. At the rear of the speaker box a parabolic reflector, 301, can be placed to ensure all sound waves reflect off the back of the box and are either concentrated when no metamaterial is used or flat when a metamaterial is used. The speaker is 302 and is powered by an electrical signal generated by a signal generator, 308 and amplified by an amplifier, 307. All functions in a device depicted in FIG. 5, FIG. 6, FIG. 7, and FIG. 8 can be controlled by a microcontroller with a computer chip, 309.

Additionally, fire detection systems can be added to the sound wave fire extinguisher as depicted in FIG. 5, FIG. 6, FIG. 7, and FIG. 8 by a camera, 303 and a smoke detector, 305. Other fire detectors and sensors can be used.

Sound wave fire extinguishing can also be combined with existing fire suppression agents, particularly water, to cool down the fuel of the fire, preventing it from reigniting. These agents can be stored in pressurized canisters, 306 and sprayed using a nozzle, 304.

Figure 13:
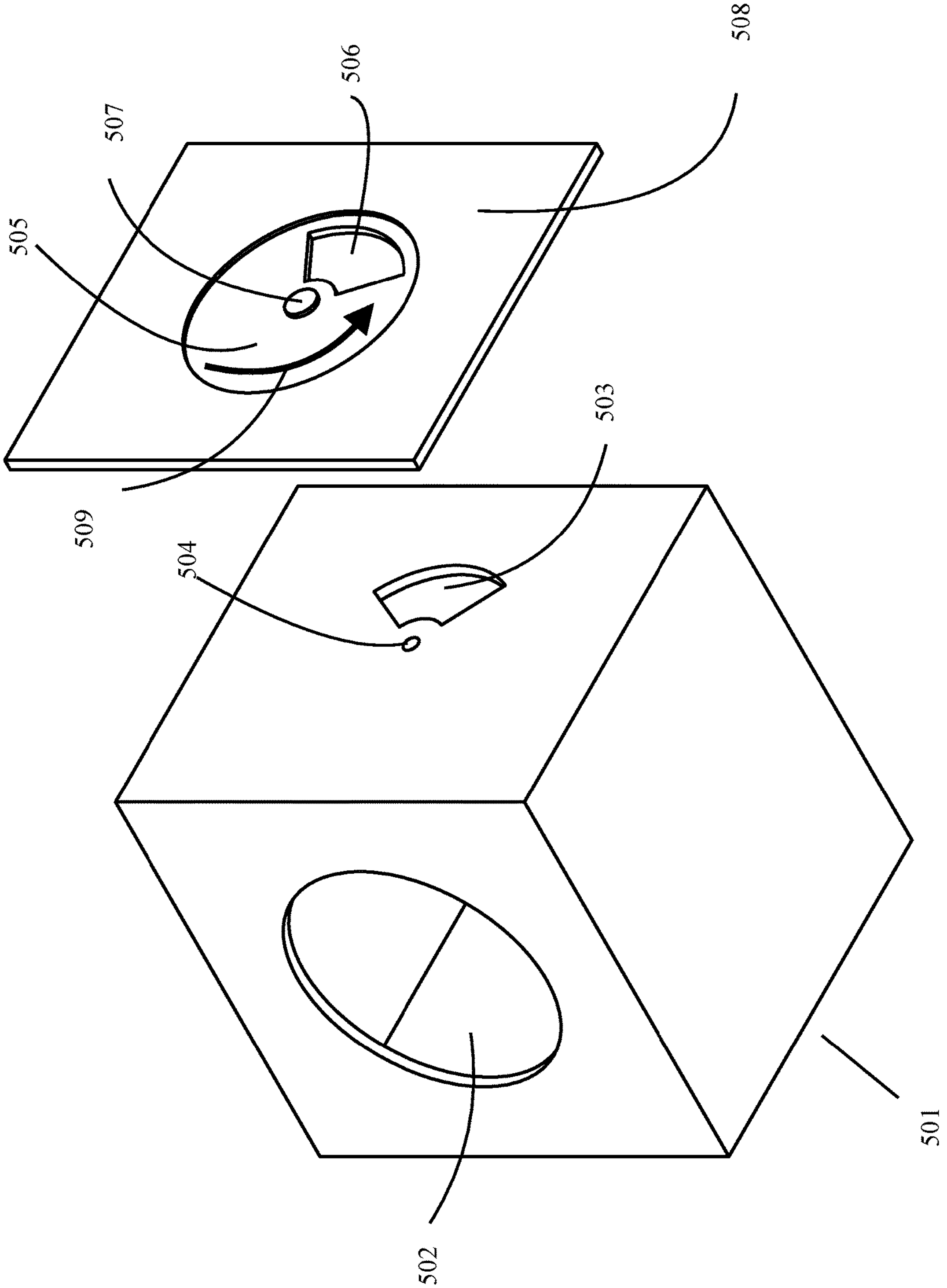
FIG. 13 is an exploded view of the pressure enhancer speaker box of FIG. 9 through FIG. 12 without the speaker in the box.
Figure 16:
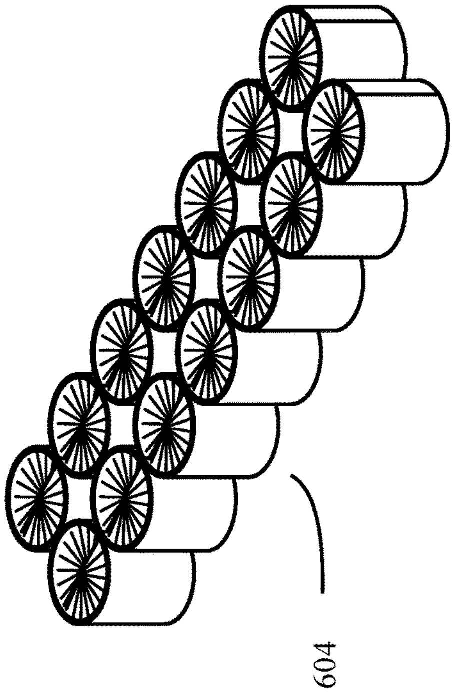
FIG. 16 depicts 2 rows and 8 columns of metamaterial coil cells in an array.
Figure 17:
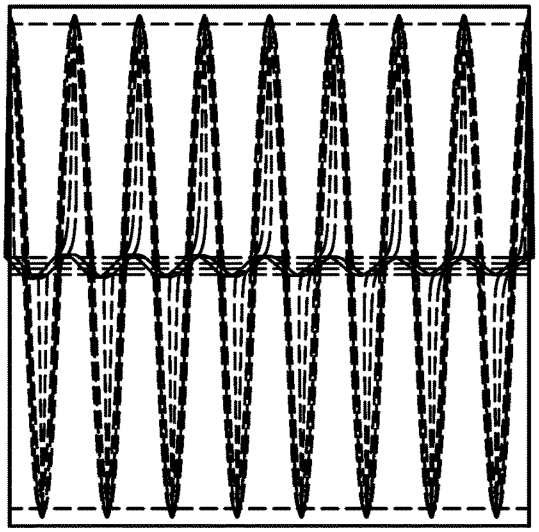
FIG. 17 depicts the coil inside the shell, forming a metamaterial cell.
Figure 14:
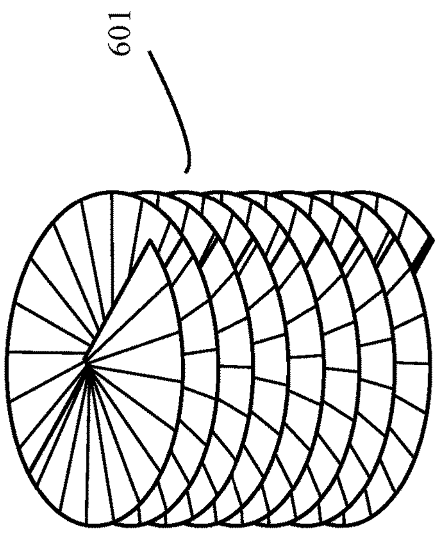
FIG. 14 depicts a metamaterial coil cell without the outer shell.
Figure 15:
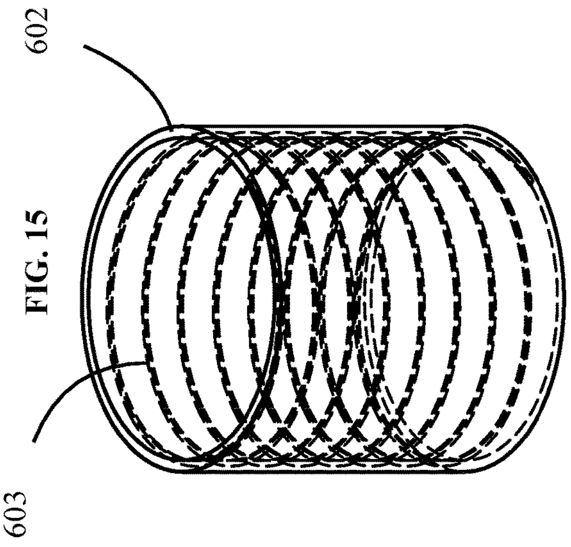
FIG. 15 depicts the outer shell of a metamaterial coil cell with threads on the inside that allows the coil of FIG. 14 to be screwed into.
Figure 18:
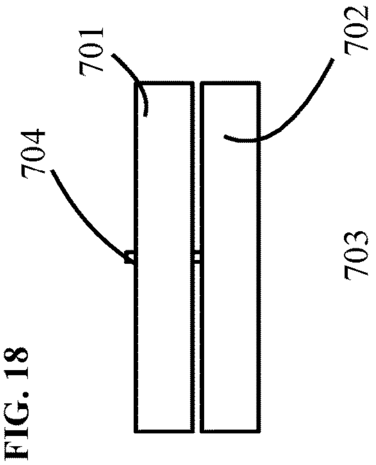
FIG. 18 depicts a tunable metamaterial plate with two metasurfaces stacked on top of one another.
Figure 19:
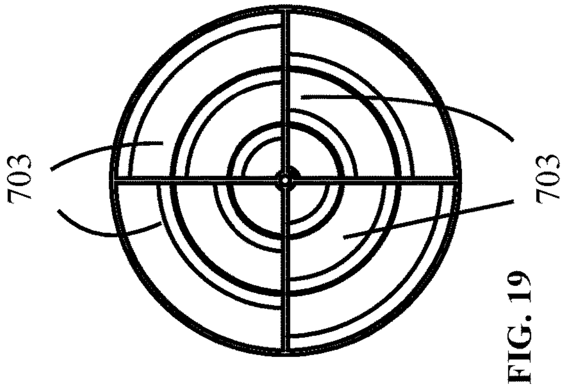
FIG. 19 is a top view of the tunable metamaterial plate.
Figure 20:
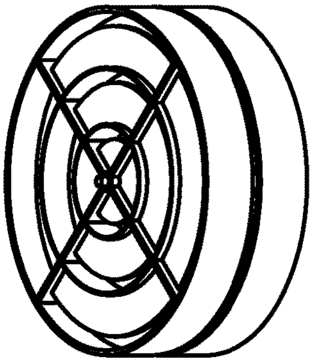
FIG. 20 is a perspective view of the tunable metamaterial plate.
Figure 21:
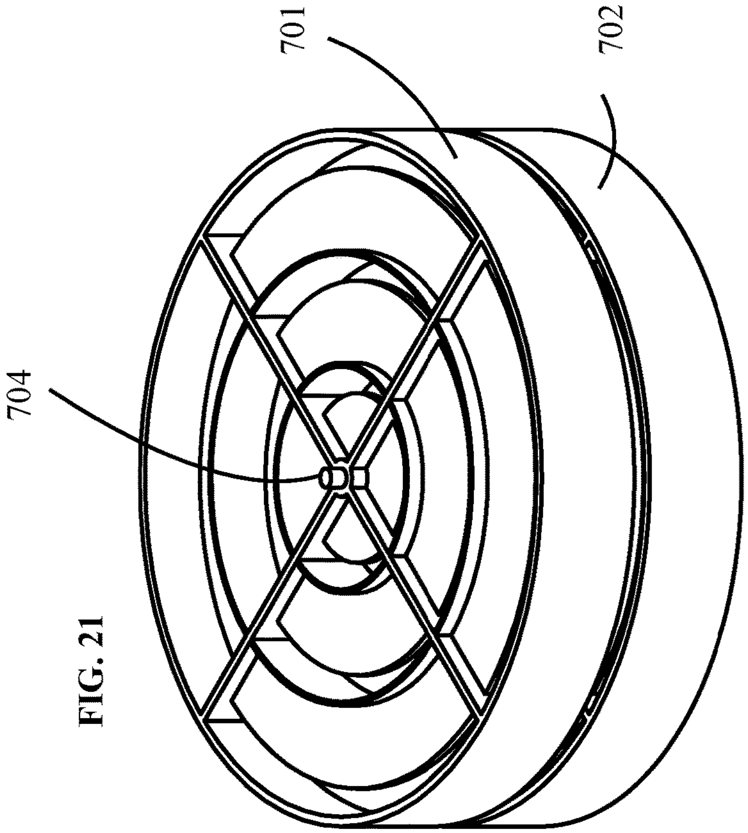
FIG. 21 is an enlarged version of FIG. 20.

FIG. 9, FIG. 10, FIG. 11, and FIG. 12, mainly an external view of speaker chamber pressure enhancer, and FIG. 13, mainly an internal view of speaker chamber pressure enhancer, depict an apparatus for a pressure enhancer of the sealed speaker box. It allows various parts of the sound wave, particularly the rarefactions desirable in fire extinguishing, to be intensified. Rotating plates 405, 505, spin centered at their corresponding axles, 406, 507, such that the cutout of the rotating plate, 506, matches up with the cutout for the air intake of the speaker box, 503 at specified times. The speaker in the diagram is 401 and it is powered by a signal generator, 403 and an amplifier, 404. All functions can be controlled by a microcontroller and computer chip 402. On the speaker box there can be a cutout for the axel 504 and a cutout for the speaker 502. The speaker box is depicted as in 501. Part 508 is the board around the rotating plate that is stationary. It acts to further strengthen the axel and prevent air from entering where the rotating plate meets the box. Arrow 509 depicts the movement of the rotating plate 505.

The SAFE invention utilizes tunable metamaterial coils depicted in FIG. 14, FIG. 15, FIG. 16, and FIG. 17. The coils of each cell, 601, can be twisted out of the shell, 602, riding on the threads of the shell, 603, such that the phase shift a call creates can be continuously tunable. These individual cells can be paired up in rows and columns to form a metamaterial array, 604, in which each cell has an individual speaker behind it.

Figure 24:
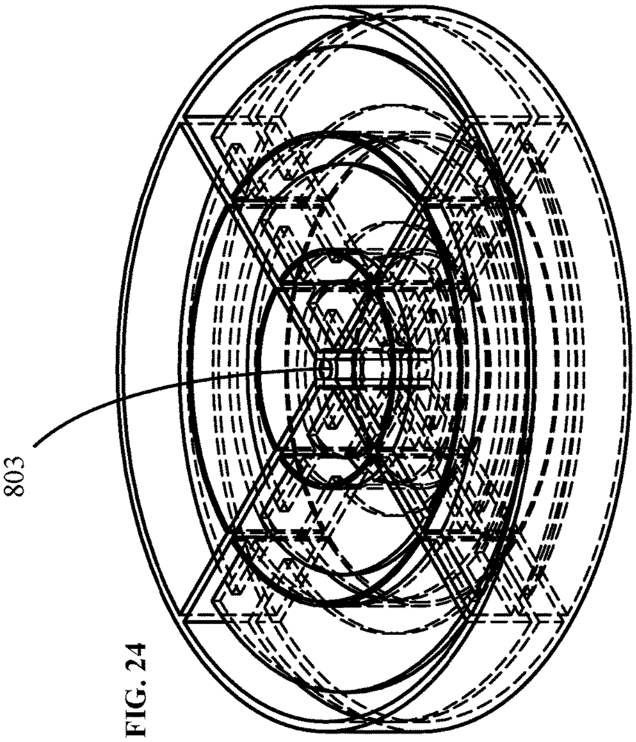
FIG. 24 is a perspective view of the tunable metamaterial coil.
Figure 22:
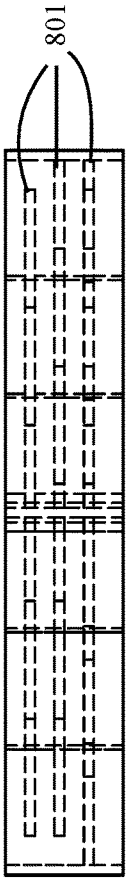
FIG. 22 is a side view of the tunable metamaterial plate highlighting its interior prong structure.
Figure 23:
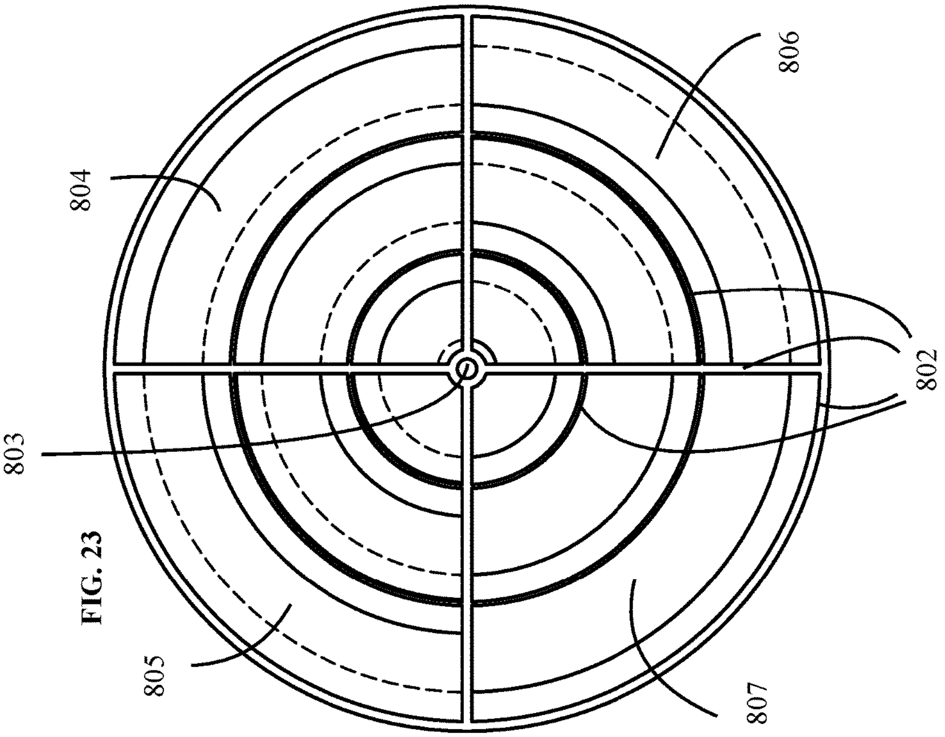
FIG. 23 is an enlarged version of FIG. 19 highlighting the differences in the internal structure of the four quadrants.
Figure 28:
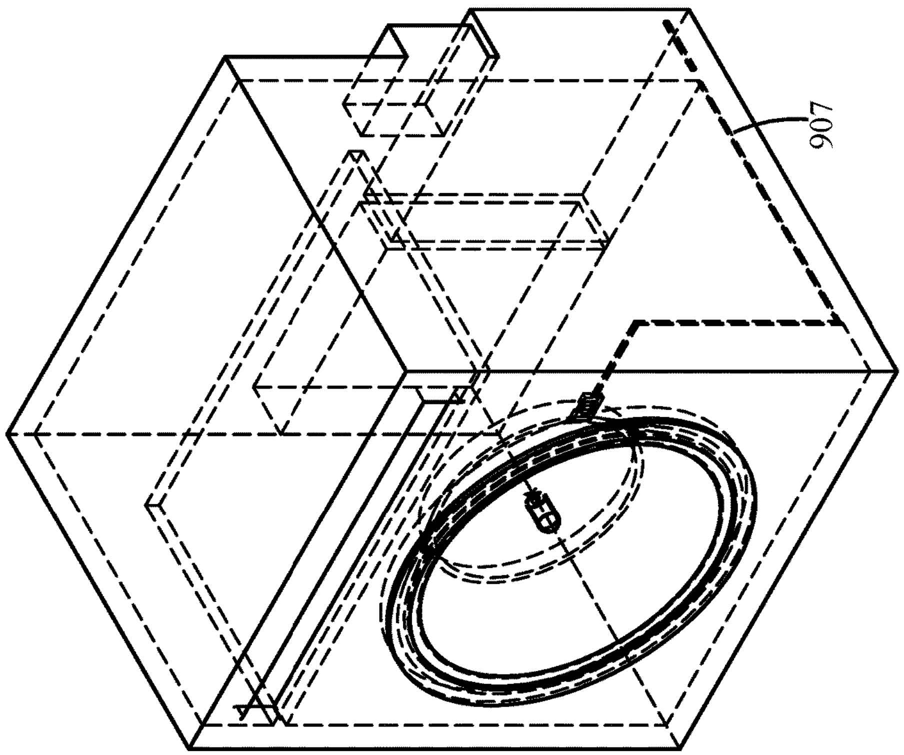
FIG. 28 is a perspective view of the vented speaker box.
Figure 26:
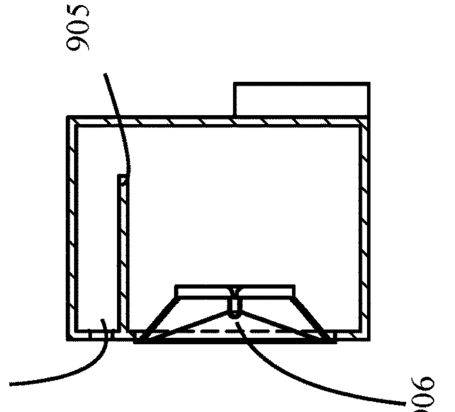
FIG. 26 is a cross section of FIG. 25 on line A-A, highlighting the structure of the vent divider within the box.
Figure 25:
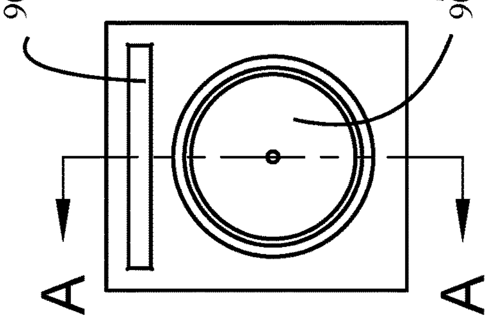
FIG. 25 is a vented speaker box with the vent above the speaker.
Figure 27:
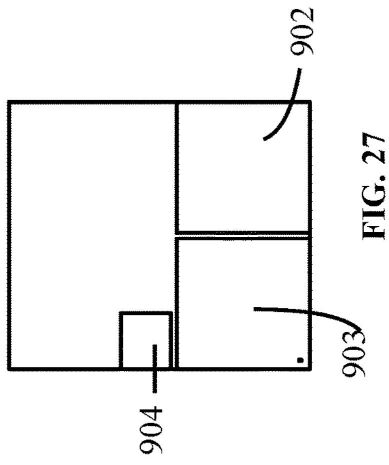
FIG. 27 depicts the rear of the speaker box with an amplifier, signal generator, and batter pack.
Figure 29:
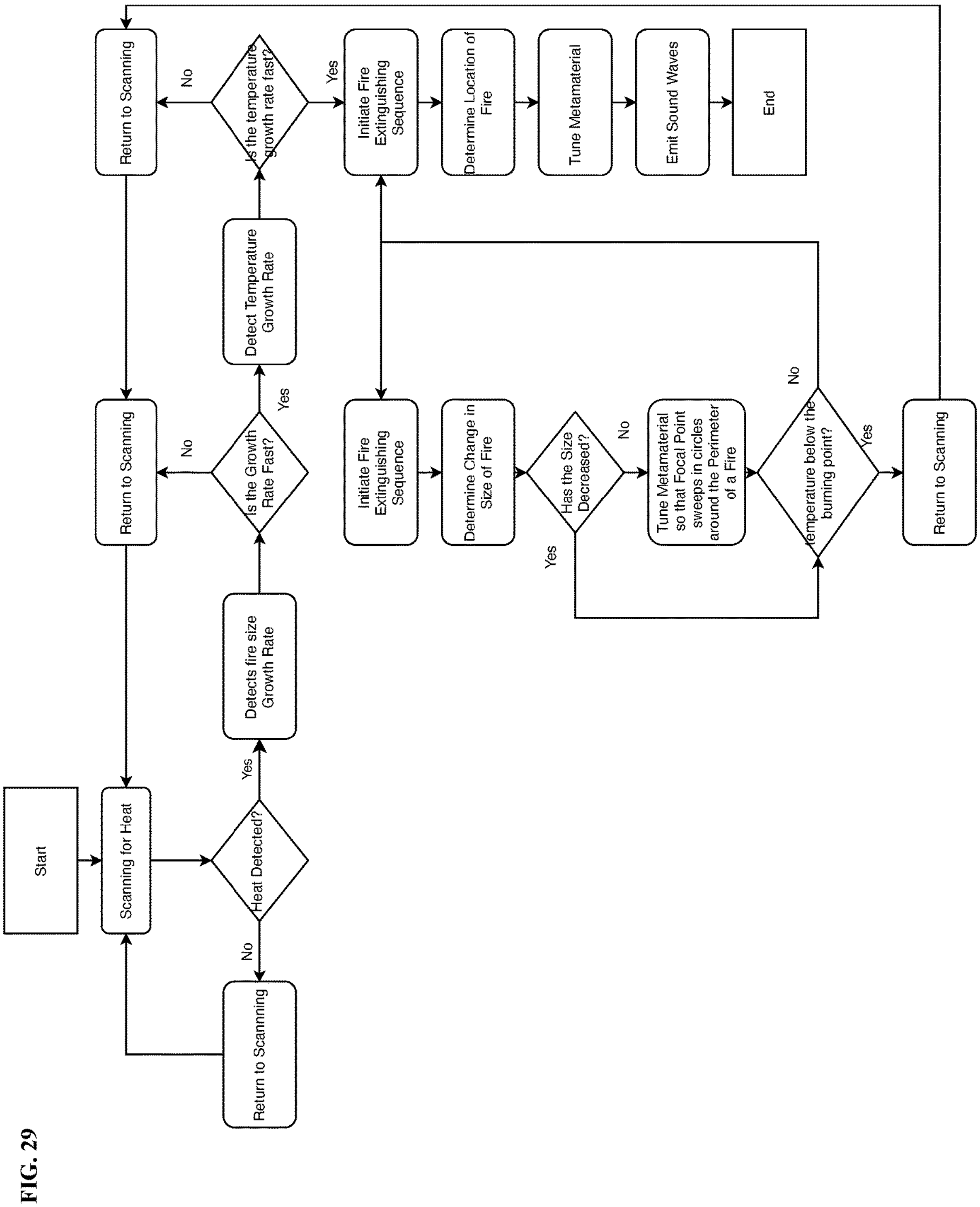
FIG. 29 is a flowchart of an example of the system workflow for automating the detection, location, and extinguishing of the device.

The SAFE invention also utilizes a tunable metamaterial plate depicted by FIG. 18, FIG. 19, FIG. 20, and FIG. 21, an external view, and FIG. 22, FIG. 23, and FIG. 24, an internal view, that consists of two metasurfaces, herein referred to as metasurface A, 701, and metasurface B, 702. Each metamaterial is divided into four quadrants, 703, of different phase shifts, each quadrant can be considered a cell. The metasurface can have an axle in the center, 704, 803, allowing metasurface A and metasurface B to rotate relative to one another. Each quadrant or cell of the metasurface contains prongs, 801, that generate the phase shift, divided by walls, 802 to prevent phase shifts of one cell from mixing with another and preventing the prongs within each cell from being excessively long. Quadrant 4 of the metamaterial, 804, has the most prongs, generating the highest amount of phase shift, quadrant 3 and quadrant 2, 805 and 806 respectively, each generates the same amount of phase shift that is less than the phase shift of quadrant 4. Quadrant 1, 807 generates the least amount of phase shift. By rotating metasurface A and metasurface B, different focal point effects can be achieved. The metasurfaces can be configured with various cell layouts, multiple metasurfaces can be used, and they can be moved relative to one another in various manners.

A vented speaker box is depicted by FIG. 25, FIG. 26, FIG. 27, and FIG. 28, differing from the sealed speaker box in that the vent amplifies the sound waves to a specified frequency a few dB greater than the sealed box. It is, however, larger in many cases and may be more difficult to manufacture. The vent is 901, separated from the rest of the speaker chamber by a vent divider 905. The speaker is 906 and connected to an amplifier, 903, and signal generator, 904, by a speaker wire, 907. SAFE can be powered using an on board battery pack as well, 902, rather than drawing energy from houses or trucks for its wildfire application.

SAFE can use a subwoofer as the speaker. Subwoofers utilize a magnet and an electromagnet (i.e. coil). When an alternating electric current is passed through the electromagnet, it magnetizes then demagnetizes at the specified frequency, vibrating back and forth because of its magnetic field rapidly changing. The permanent magnet is fixed in place so that only the electromagnet moves. The vibration of the electromagnet creates the sound that is heard. SAFE can use such a model or flip the roles of the magnet and coil, placing the coil on the outside and the magnet in the center that vibrates back and forth driving the speaker cone. This increases the weight of the center core, increasing the potential velocity of the cone thereby increasing SPL (sound pressure level). It also allows the coils to not be in motion, so that cooling mechanisms can be attached to it and the overall stability of the speaker is greater. Additionally, typically speaker cones that drive air forward and backward are made of paper. SAFE can utilize ultra-light and high rigidity materials such as graphene to further increase SPL and ensure the longevity of the device.

The signal generator creates the necessary current at the specified frequency to the speaker, and the amplifier amplifies the signal to increase the dB output of the subwoofer. The SAFE invention includes several adaptations or features that can aid the functionality of this general module for sound wave fire extinguishing, and potentially other applications.

In the present detailed description section below, various adaptations to the general module will be described. The various adaptations described can be used in conjunction with one another for the overall functionality of the device, and also can be individually used.

Metamaterials can manipulate the propagation of electromagnetic or mechanical waves, creating the possibility to focus sound waves strong enough to extinguish large fires with a relatively small device. When the metamaterial is configured to focus sound waves, despite the long-distance sound waves traveling from the speaker to the fire must endure, the dB increase of sound waves at the fire created by the focal point would outweigh, balance, or minimize the dB decrease caused by transmission loss and sound wave dispersion, ultimately extending the range of sound wave fire extinguishers and making it possible to commercialize the technology.

The metamaterial manipulates sound waves by slowing waves, or in other words, adjusting the phase of the wave. It achieves this phase shift by varying the distance a sound wave must travel within the metamaterial before exiting the structure.

By manipulating varying levels of the phase of a sound wave at different locations across its wavefront, the sound waves exit the metamaterial exhibiting areas of constructive and destructive interference in specified areas. A metamaterial is composed of different chambers that can slow down sound waves at specified phases. These chambers are referred to herein as cells. Different combinations of cells producing different phase shifts generate different patterns of constructive and destructive interference. In a metamaterial configured to focus sound waves, cells at the periphery of the material slow sound waves less than cells at the center of the metamaterial. This is similar to a convex lens which slows light more at the center than the periphery to bend light toward a focal point.

The collection of cells are referred to herein as metasurfaces. Metamaterials are a metasurface(s) that generate the final desired constructive/destructive interference pattern. The term "focus" is used to describe the abnormal increase in amplitude at the desired point caused by the metamaterial. The tunability of a metamaterial is the ability of the focal point of the metamaterial to be altered through a minimal mechanical motion of the components.

An estimation of the phase shift of a cell can be calculated using the geometric dimensions of the cell. However, the intended phase shift of a cell may be different in practice due to anomalous reflections or imperfections in the material. SAFE developed a method of measuring the exact phase shift each cell creates by placing the duplicate versions of a cell in a checkerboard grid in such a way that every other space of the grid contains a cell and the adjacent spaces are empty. The more grid spaces, the more accurate the measurement. Using a signal generator, amplifier, and speaker, sound waves can be played through the grid. The sound waves will be played with a frequency sweep in a range determined by the estimated cell shift length added by the margin of error believed to exist in that calculation. The frequency at which sound waves are the quietest once they exit the metamaterial is where the cells shift the sound wave 180 degrees, therefore canceling out the sound waves exiting the grid through the empty spaces. The wavelength of this frequency divided by two is the phase shift the cell creates. Metamaterials can be manufactured through processes including 3D printing, injection molding, or machining, however, it is important to note that since the phase shifts created by metamaterials rely on the reflection and "channeling" of the sound waves, for lower frequency sound waves, materials with higher rigidity can be used. Rather than utilizing plastic parts that low frequency sounds may easily "permeate" through, steel or other metallic parts can be used to ensure that the sound is not absorbed.

A standard metasurface lens consists of small cells that individually manipulate a specified phase of the sound. The inner structure of each cell varies based upon the length of a soundwave it is intended to shift. Structures include a labyrinthine structure depicted in FIG. 1 similar to a maze, a coil structure, or any other maze-like path that requires the sound wave to travel through the cell in a path longer than it would travel the physical length of the cell.

One of the most basic metamaterial structures is the labyrinthine structure. Each cell consists of four walls with two openings opposite one another. The sound waves travel through the two faces of the cube/rectangular prism through without walls. Within these walls are prongs protruding perpendicular from one wall a length less than the width of the structure and the width of the span of the walls. As sound waves travel through the cell, the prong(s) force the sound wave to circumnavigate it, thereby increasing the distance the sound wave must travel within the cell before it exits. There can be as many prongs as desired; the more prongs or the longer the prongs, the greater the phase shift of the cell, however, it is necessary to note that if there are too many prongs in a given space, the sound wave has many opportunities to be trapped and lose energy. To minimize this energy loss, the edges where the prong connects with the outer wall of the cell can be chamfered, or a rounded bevel can be added to encourage the orderly reverberation of particles within the cell, and minimize areas of turbulent particle movement within the cell.

There can be a wall between each cell to prevent the sound waves that are traveling in different cells of different phase shifts from mixing and canceling one another out. In standard metasurface lenses made to focus sound waves, the outer edge's cells will shift less phase of a sound wave than the center of the lens.

SAFE has developed its metamaterial structure that allows for tunability yet concurrently ensures minimal mechanical movements and compactness. These can be called "tunable metasurface plates."

Tunable metasurface plates are composed of two or more metasurfaces of the same or different patterns. Each metasurface contains cells based upon the desired focal point location of the entire tunable metasurface plate. To illustrate the tunability of the metamaterial, a metamaterial with a focal point that circulates will be described, however, different configurations of the cells within the metasurface can create various other focal-point sweep patterns.

A metasurface is divided into four quadrants with two perpendicular lines bisecting the center of the circular metasurface. The cells within distinct quadrants shift different amounts of a wavelength. The upper left quadrant (quadrant 2) shifts the least amount of a wavelength—1 unit, the bottom right quadrant (quadrant 4) shifts the most amount of a wavelength—3 units, while the upper right (quadrant 1) and lower left quadrants (quadrant 3) of the metasurface shift medium amount of a wavelength—2 units. The phase-shifted by quadrants 3 or 1 is half the amount shifted by quadrants 2 and 4 combined.

In this particular tunable plate metamaterial, there are two metasurfaces. Both metasurfaces have the same cell structure. The plates are stacked such that there is a metasurface on top (metasurface A) and a metasurface below (metasurface B), with the transducer above metasurface A. The plates are stacked on top of one another such that quadrant 2 of metasurface A is above quadrant 4 of metasurface B. When the transducer, in this example a speaker, emits sound, the sound waves are forced to travel through the cells of each metasurface. Since quadrant 2 of metasurface A is stacked above quadrant 4 of metasurface B, quadrant 4 of metasurface A is above quadrant 2 of metasurface B, quadrant 3 of metasurface A is stacked above quadrant 1 of metasurface B, and quadrant 1 of metasurface A is stacked above quadrant 3 of metasurface B, the effective phase shift of the entire metamaterial is the same through the entire metamaterial: 4 units. This simply slows down the sound wave exiting the speaker by 4 units and does not shift phase differently at various parts of the metamaterial. If, however, the bottom plate rotates three-eighths of an entire rotation, the effective shift of the entire metamaterial will be drastically changed. The area where half of quadrant 4 of metasurface A is above quadrant 4 of metasurface B, the effective phase shift of the metamaterial at that location is 6 units. Adjacent to that section is where metasurface A is composed of quadrant 4 cells while metasurface B is composed of quadrant 3 or quadrant 1 cells. The effective phase shift of the metamaterial at that location is 5 units. Adjacent to that angle, by adding up the unit shift achieved by the portion of the plate above and plate below, is the effective phase shift of the entire metamaterial at that section. Overall, one end of the metamaterial shifts 6 unit phase, gradually reduced by 1 unit every section (⅛th of the disk) until the overall shift at the other end is 2 units. Thus, sound waves that pass through the material are louder on the side of the greater phase shift.

The distance between each metasurface can be altered. Since sound disperses, in this case, if the distance between metasurface A and metasurface B increased, sound waves traveling through metasurface A will have the opportunity to disperse slightly before entering metasurface B. This creates an area to the periphery of the metamaterial that has yet another different phase shift pattern. In this case, if metasurface A and metasurface B have a gap between them, sound waves passing through both metamaterials will exhibit normal patterns based on the rotation of the two lenses. However, at the periphery, the space adjacent to the area of sound waves that travel through both metasurfaces, the phase shifts of 1, 2, and 3 units generated by quadrants 1 through 4 of only metasurface A will be expressed.

Furthermore, if within each quadrant of a disk, the phase shift is tapered such that the there is greater phase shift at the periphery of the disk than the center, while the most extreme phase shift of a quadrant is no greater than the least extreme phase shift of another quadrant on the same disk, then the focal area will become more of a focal point since the size of the focal area is decreased.

Additionally, similar to the two lenses of a microscope, a metamaterial that alters the distance of a focal point from the metamaterial itself can be made. Such a metamaterial would comprise two or more metasurfaces that the distance from one another can be adjusted to increase or decrease the distance of the focal point from the metamaterial.

The amount shifted by each quadrant in the case above can be altered, changing the angle of depression of the emitted beam. Additional quadrants can be added to taper the phase shift from left to right to become more gradual or abrupt, altering the effectiveness and efficiency of the lens. Furthermore, sections do not need to be divided by lines bisecting the center of the circle. In fact, the metasurface does not need to be circles at all. More than two metasurfaces or one metasurface can be used. Essentially, any cell configuration and any metasurface configuration can be used such that when altering the location, rotation, or orientation of metasurfaces the desired wave manipulation will be achieved. By altering the location, rotation, or orientation of a metasurface layer, different metamaterial effects can be created without the need for altering the complex configurations of the individual cells.

This methodology can be applied beyond metamaterials and cells. Essentially the different rotations, or other types of movements, of different bodies can change the overall effect exponentially similar to two polarized lenses.

The angle of the focused beam of sound waves SAFE can emit with the tunable metasurface plates may be limited at the current level of its technology. The beam may not be capable of tuning perpendicular to the direction that sound waves are emitted by the speaker, for example. Therefore the taller the room, the greater the flexibility of location for the device. In low ceiling houses, SAFE can be installed in a corner of the room to ensure that all parts of the room are protected by the device. When SAFE's installation location is not limited by the size of a room, it can be installed inside the ceiling such that the opening of the speaker will be flush with the ceiling.

Another example of a type of metamaterials usable in SAFE are tunable metamaterial coils. The tunable metamaterial coils, unlike standard labyrinthine metamaterials, force sound waves to revolve within each cell before they exit. This allows for a more natural method of sound propagation, preventing sound waves from getting trapped or absorbed in tight turns or corners. Additionally, the coil-shaped cell can act in a way similar to a screw. The coil can be screwed in and out of an outer shell, which allows for its tunability.

The metamaterial adjusts the phase of the wave through the distance the sound wave must circulate inside the metamaterial before exiting the structure. When the coil is completely in the shell, it shifts the maximum phase. As it is slowly screwed out, its phase shift gradually decreases.

The tunability of the metamaterial allows for the location of the focal point to be changed. For example, if the screws on the left side of the structure are screwed in more than the screws on the right side, then the focal point will lean toward the left. Additionally, the distance of the focal point from the structure can be adjusted based upon the behavior of the fire.

For a 60 Hz sound wave, for example, each cell can be about 18 inches×18 inches×18 inches (18 inches is the diameter of a typical large subwoofer) with the coil revolving 4 times inside the outer shell, making the 60 Hz wave travel a total of approximately half a cycle within the metamaterial before exiting the metamaterial when the coil is completely screwed in. When revolving the coil to screw it out of the outer casing, the phase shift of the cell would be decreased, and when revolving the coil to screw it into the casing, the phase shift would increase.

Each metamaterial can have a motor built into it that automatically adjusts the focal point of the speaker array according to computer chip signals that can detect precisely where a fire is advancing.

Another variation of tunable metamaterial coils is a stretchable tunable metamaterial coil. Rather than tuning the metamaterial by screwing the coils in and out of the shell, which when screwed out may cause anomalous sound wave reflections due to protruding coil, stretching the coil within the shell eliminates that inefficiency.

Stretchable coils can be made from pliable materials or strategically manufactured coils that have joints in specific areas. To achieve high amounts of phase shift the coil can be compressed, thereby rotating on itself, ultimately forcing the sound waves to circulate at a faster rate than they were originally moving forwards. To achieve low amounts of phase shift, the coil can be stretched, ultimately forcing the sound waves to travel in a more linear and direct path forward.

A speaker chamber configured to increase the dB level of sound waves of at least one frequency, wherein the speaker chamber comprises a substantially closed space encapsulating one end of the speaker, and wherein the speaker chamber is at least partially sealed, can also be utilized in the sound wave fire extinguisher. The speaker chamber prevents sound waves exiting from the back of the speaker, 180 degrees out of phase compared to the sound waves at the front of the speaker, from canceling the waves exiting the front of the speaker. The vented speaker chamber allows high dB output at ultra low frequencies.

For enclosures at the rear of the speaker, the enclosure can rely on existing speaker box acoustics mathematics utilizing Thiele/small parameters. Based upon the location the end-user wants to place the device, the speaker box can be either ported, with a small vent or sealed. Typically, however, since extremely low frequencies of sound are desirable, ported speaker boxes can be commonly used. These, however, take up greater amounts of space and may be difficult to use in home fire extinguishing applications. Speaker boxes can have supports in them to increase the strength of the structure.

In those cases, the raw speaker driver can be installed in the ceiling. The rear of the speaker can be enclosed by the space between the ceiling and floor of the above room. Or the rear of the speaker can be placed inside a wall such that the space between in the center of the wall acts as the speaker casing. Not only does utilizing the spaces in the ceiling or wall as the speaker enclosure saves space by bypassing the need for a speaker box, but the reverberations of the speaker can also vibrate the wall or ceiling, turning them into speakers as well. If however, a wall or ceiling does not have the structural integrity to support said reverberations, foam, or any other shock-absorbing material can be placed between the speaker and the wall/ceiling to cushion the vibrations.

The speaker chamber can also be at the front of the speaker in which the locations at risk of igniting into flames is within the speaker chamber. For example, if SAFE is intended to be used in computer server spaces, where particular large computers are at risk of fire. The front of the speaker can be enclosed by the casing of the computer itself. When the speaker plays a sound, the speaker casing will trap and amplify all of the sound waves emitted by the speaker similar to the body of a guitar when the strings are analogous to the speaker. Another example is the use of an entire room as the speaker chamber for SAFE.

Additionally, methods to enhance the force of the sound waves at particular cycles of the sound can also be utilized. Toward the side of the speaker casing, an opening will be created that allows air to flow in and out of the box as the speaker vibrates forward and backward, expanding and condensing the air inside the speaker, respectively. Since Rarefactions are the most desirable part of a sound wave for the sound wave fire extinguisher, a spinning circular plate with a small cutout in one quadrant of the plate will be placed on top of the cutout from the speaker casing equivalent in size and shape. The circular plate will spin in sync with the oscillations of the speaker such that the speaker casing is closed when the speaker is moving forward and pushing air out, therefore decreasing the amount of air inside the speaker. This creates an area of low pressure within the speaker that later sucks the cone of the speaker back into the box forcefully, increasing the power of the rarefaction. The rotating plate spins such that when the speaker begins to compress the air inside the box and therefore create the rarefaction projected toward the fire, the cutouts align, opening the speaker casing so that air can easily rush out of the box when the speaker moves backward. There is a slight delay between the speaker returning into the box and the cutout opening to increase the vacuum pulling effect created by the rotating manifold. The speaker first begins to move back then the cutout opens. The size and shape of the cutout can vary based on the dimensions of the speaker and the desired frequency so that the circular plate can spin continuously without alterations in its speed and still create the desired opening and closing effect in sync with the speaker. Rubber or simply rough brushes can be used to seal it.

In a typical speaker, sound waves exit it from both the front and the rear since sound waves in a speaker are generated by a vibrating cone meaning it travels both forwards and backward. Sound waves traveling through the front of the speaker and into the metamaterial are desirable, so the sound waves emitted from the rear of the speaker are reflected to the front using a parabolic reflector.

The parabolic reflector can be placed at the rear of the speaker and reflect sound waves exiting from the rear of the speaker to a focal point in front of the speaker. The parabolic reflector creates this focal point with its unique parabolic shape so that sound waves reflecting off its surface bounce at various angles and converge at a focal point. Additionally, based upon the specifications of the speaker and metamaterial, the parabolic reflector will be customized to amplify the focusing effect of the metamaterial. Rather than typical parabolic reflectors that reflect waves and particles such that they converge at some focal point, SAFE's parabolic reflector can reflect the sound waves generated by the speaker back in a plane such that they enter the metamaterial in the same phase, ready to be manipulated for convergence at the said focal point. Reflecting sound waves in a plane can be very important because speakers can have various errors such as the speaker cone rigidity being too low, splitting up into small vibrational plates, or the cone-shaped cone that emits sound waves at different phases across the surface of the cone. This can cause the metamaterial to create anomalous focusing patterns in the near range.

In addition to solely emitting sound waves, SAFE can emit other agents of fire suppression or gases to increase the overall extinguishing power of the device.

SAFE can emit low-density non-flammable gases such as sulfur hexafluoride to increase the effectiveness of the sound waves on fire. When a fire is first detected, a stream of the gas can be emitted through a nozzle directly at the fire. The sound waves as they propagate through the dense gas naturally deepen, increasing the extinguishing effect. Additionally, the gas itself pushes oxygen molecules away from the fire, further suffocating it. The gas/gases can be stored inside pressurized chambers within the device.

Instead of utilizing gases, water or other chemical fire suppression fires can be sprayed at the fire in unison with the sound waves. Small amounts of water, for example, can be sprayed onto the fire after it is put out by the sound waves. Since sound waves cannot decrease the temperature of fuel significantly, the sprayed water will decrease the temperature of the fuel, preventing it from flaming up again.

If a fire occurs in a home, the SAFE device installed in the corresponding room will automatically emit a beam of low-frequency sound waves to extinguish the fire. Whether or not a user is present when the fire occurs, SAFE functions automatically through three stages: detecting, tuning, and extinguishing.

SAFE uses a microcontroller combined with an infrared sensor to detect fires and trigger all other functions of the device. A microcontroller is a mini-computer on a circuit board designed to perform specific operations. SAFE can use infrared sensors connected to the microcontroller to detect heat signatures. If it detects an abnormally high area of heat, which in most cases signifies fire, the microcontroller triggers a sequence to verify that the area of heat is, in fact, a fire that has potential harm.

The infrared sensor can be paired with carbon monoxide and other toxic gas indicators, a camera, and other sensors to ensure that the heat spike is truly in fact a fire. If intense heat is detected by the infrared sensor and abnormal levels of toxic gases typically associated with fires are present, the fire extinguishing sequence can be triggered.

Additionally, since a desirable fire may occur such as a candle or fireplace, SAFE can utilize machine learning algorithms in unison with the sensors to learn the differences between a benign fire and a harmful one as well. By feeding a machine learning algorithm different video footages of fires both harmful and benign, it can slowly learn the differences often undetectable by humans and develop a set of conditions that become more accurate during the life of the algorithm. These conditions can be uploaded to the SAFE device for rapid detection and determination by the onboard microcontroller and regularly updated as the algorithm refines itself via software updates. With the development of the internet of things, SAFE can be connected with the home's wifi so that video footage of fires that occur can be sent to a central database for further analysis. Possible indicators that the Machine Learning Algorithm can be taught to detect include but are not limited to measuring the growth rate of the fire/heat signature, measuring the acceleration of carbon monoxide emissions of the fire, or simply the change in size and movement of the heat signature.

SAFE can use multiple sensors to create a three-dimensional map of the space and triangulate the precise location of the fire. Once the detection of a harmful fire is confirmed, the microcontroller can tune the metamaterial so that the focal point is at the center of the base of the fire. Since tuning the metamaterial may take several seconds, the speaker can first be activated to begin suppressing the fire. Once the metamaterial is tuned properly the fire can be extinguished. If, however, the size nor temperature of the fire doesn't decrease as expected when the speaker is playing low-frequency sound waves, the microcontroller will employ various strategies to further extinguish the fire. They include but are not limited to rotating the focal point of the sound waves around the fire and slowly decreasing the radius of rotation thereby forcing the base of the fire to shrink, changing the frequency of the sound wave since different frequencies may have different effects on various fire sizes and fuels, utilizing the geometry of the room to amplify the sound wave by bouncing the focal point off various surfaces that increase the resonance of the sound waves inside the room, or altering the size or shape of the focal point to maximize efficiency for a wide range of fire sizes.

If the size nor temperature of the fire still doesn't decrease, other extinguishing agents can be activated or the fire department can be directly notified. The fire department can be notified by connecting the SAFE device to the wifi.

SAFE can be installed with the geometric shape of the room and furniture in mind to use the entire room as a resonance chamber that increases and sustains the dB level of the sound wave just emitted by the speaker as it travels to the fire.

SAFE can be installed a specific distance away from the ground of the room to create constructive interference or destructive interference with the reflected wave. Standing waves can also be created to create different extinguishing effects.

For example, if in a particular room the ceiling height is equivalent to the wavelength of a fire extinguishing sound wave, then the speaker can be placed in the ceiling. If however, the ceiling is lower than that, the speaker can be placed on the edge of a room (i.e. where the wall and ceiling meet) and angled toward the ground such that when sound waves hit the ground, reflect to the opposite wall, then bounce back to the speaker, they have traveled a full wavelength. This allows reflected sound waves to constructively interfere with the sound waves continuously being emitted by the speaker.

Similar to how home theater installers do the "subwoofer crawl" to determine subwoofer placement by placing the subwoofer in the location where it should be the loudest, the couch, then crawl around the room to find the loudest area on the ground, SAFE installers can place the device in the most fire vulnerable locations of the room and determine where the speaker should be placed. Microphones can be used to determine the loudest location.

With the creation of many simulation software today, for more precision reliant installations, the room can be mapped out and physics simulation software can determine where the best placement of the speaker is.

It may be the case that with the advancement of sound wave fire extinguishing technology, standing waves, or other types of sound waves are desirable. In those cases, the positioning of the device can have the creation of those waves in mind to maximize efficiency. In the case of the standing wave, the speaker can be placed in the ceiling a distance from the ground equivalent to half the length of a typical sound wave. The waves reflected from the floor will bounce back and create a standing wave with the "fresh" sound waves emitted by the speaker. Additionally, more than one speaker or a SAFE device can be placed in one room. This opens the possibility of electronic phase shifts. The placement of these multiple devices can also rely on the geometry of the room to increase the dB level or change the type of sound wave. In warehouses, SAFE can utilize beam steering principles and strategic speaker placement to amplify sound waves that extinguish fires on the warehouse floor. Multiple SAFE modules may be used for large areas and can be mounted or hung down from the ceiling. These individual modules can play in unison. The phase of each subwoofer will be altered to achieve constructive interference at the location of the fire. Phase shifts can be created electronically or using metamaterials.

The speakers can be placed in a manner such that it leverages the warehouse space to maximize the dB level. For example, if the horizontal range of a subwoofer has only a 50-foot radius of ground coverage, subwoofers can be placed in a grid pattern 100 feet away from one another to maximize coverage and minimize costs. If constructive interference is desired, the subwoofers' ranges can be positioned to overlap with one another. With phase shifts, these subwoofers can create focal points.

When combating wildfires, multiple general modules of SAFE can be placed together in a row to form a speaker array. Additional speakers can be added to the array and additional rows can be added to increase power and adjustability of the fire extinguisher. As additional modules are added, the array can become quite large; these modules can be mounted on cars or individually transported to the site of the fire and planted in the ground.

Each speaker can be in a speaker box. In front of each speaker can be a coil metamaterial cell. One potential challenge with utilizing coil metamaterials is the storage of them. The stretchable metamaterials can be compressed for transportation, while the standard ones can be screwed out of its outer shell. The shells can be made in varying sizes so that they can be stacked within one another and the coils can be stacked on one another such that the blades of the coil interlock.

In an array of speakers comprising one row, the cells of the outside can be screwed out more than the cells of the inside to focus sound waves once they pass through the metamaterial. In this configuration, the vertical position of the focal point is beyond the metamaterial and the horizontal position is at the center of the metamaterial. Each cell can easily be reconfigured. For example, the cells to the left of the array can be all screwed out and the cells to the right of the array can be all screwed in, adjusting the location of the focal point to the right of where the focal point was in the previous setup. Gradual movement from the first setup to the second setup will sweep the focal point from the center to the right, creating a virtual sound wall of high-intensity dB. The cells to the right of the array can all be screwed out and the cells to the left of the array can be all screwed in, creating a focal point to the left of the focal point of the first set up. This third setup can be slowly changed to the second set up so that the sound waves can sweep from left to right and create a long sound wall.

If there are additional row(s) of these speakers, the cells can be altered in a similar fashion described previously to also adjust the vertical position of the focal point. In cases where the array is placed on the ground, it can be useful to adjust the focal point of the array vertically to suppress fires at higher levels where there are dense and thin branches.

Based upon where the fire is advancing and retreating, the focal point of the sound waves can be varied accordingly using data gathered by infrared sensors.

The position of the entire array can also be adjusted to angle upward, downward, leftward, rightward, or straight at a fire.

Additionally, other methods can be used to achieve phase shift like metamaterials especially since in these speaker arrays, many units of speakers are used. The position of the speaker can be altered. If a speaker is behind the rest of the array by less than half a cycle of the sound wave, then the sound waves emitted by the speaker are slower than the sound waves of the other speakers. Speakers can be placed in a row, each with an individual rack that allows the speaker to slide forward and backward. This, however, may not be practical for limited spaces since the wavelength of low frequency sound waves can become extremely large, requiring racks multiple meters long. In place of this, adjusting the phase of the individual speakers electronically is also possible. A microcontroller can be used as the signal generator and it can be configured to emit the signal of each speaker at specific phases. However, this can be extremely costly and may not achieve the near range focal points metamaterials can.

Multiple SAFE arrays can be used to contain and extinguish a wildfire. If there is a small number of SAFEs close to a reported wildfire, available SAFEs can be lined up so that they operate against the wind. This will prevent the fire from spreading rapidly until reinforcement SAFEs dispatched from other fire stations can arrive to fully contain the fire. Analyzing the wind conditions and the spread of the fire, the SAFE modules can be brought to a safe distance and then project a wall of sound to stop the spread of the fire. Based upon the speed of growth of the fire, SAFE may be able to force the fire to retreat, however, if it is spreading too quickly, once it reaches a certain distance from SAFE, the high dB level will stop the spread of the fire. Depending on the growth of the fire, additional SAFE arrays can be deployed per square feet such that the sound waves of the individual arrays can reinforce one another. Later additional units of SAFE can be transported to the other sides of the fire, stopping its spread.

In extremely dry and windy conditions, it may be that SAFE simply stops the spread of fires, holding the sound walls until the fire burns itself out, which may not be bad for the environment in general as it renews the carbon. However, if the forest is relatively moist and not windy, SAFE can force the edges of the fire to retreat, eventually extinguishing the fire. The metamaterials can manipulate the distance of the wall from the device, so it does not require physical input to move the array unless the extinguisher must push back the edge of the wildfire a substantial amount.

Also, drones or other aerial vehicles can be utilized to deploy SAFE. One module of SAFE can be placed on an individual drone. Multiple drones can fly in unison to create beam steering effects and contain the wildfire, eventually potentially extinguishing it.

SAFE can be handheld as well, perfect for applications on space crafts or municipal firefighters. The handheld version can comprise a speaker, a parabolic reflector, and a standard non-tunable metamaterial lens. Since handheld versions can be held in the hand and therefore change position easily, a tunable metamaterial lens may not be needed. The standard metamaterial can be configured to create a focal point of sound waves at a set distance from the device. However, if the end-user prefers, a tunable metamaterial that's focal point can be adjusted to be further or closer to the device can be used. Using such a metamaterial allows the user to increase the distance of the focal point from the device when the fire is unbearably hot or decrease the distance of the focal point from the device when the fire isn't unbearably hot and additional power is desired.

SAFE can also extinguish fires that occur on power lines. In these cases, it may be desirable to have one device on each pole that emits sound from both ends to protect electric wires on both sides of the device. To create this effect SAFE can use two speakers, one speaker with two cones, or one speaker.

Two speakers can be placed in a speaker box, one on either end and play sound 180 degrees out of phase so that the two speakers work constructively. Two tunable metamaterials can be used, one on each speaker so that if the electric line breaks in half and sets a nearby tree on fire, the focal point can be pointed at the tree.

One speaker that consists of the typical speaker components with an additional speaker cone such that one cone drives sound waves from the rear of the speaker and the other drives sound waves from the front of the speaker. A custom box can be made for this and two metamaterials can be utilized.

One generic speaker can be used with a metamaterial on the front of it and the rear of the speaker open. The area the device extinguishers will mainly be at the front of the speaker, however, the rear of the speaker will allow some sound waves to suppress fires as well.

When a fire is detected, SAFE can be configured to cut power from the lines or contact a nearby operating system and have then verified there is truly a fire, then cut the power to prevent the growth of the fire. In addition to alerting the nearby operating system, SAFE can also send live video footage of the fire to them.

The invention claimed is:

1. A fire suppression apparatus, comprising:
a speaker;
a metamaterial comprising a labyrinthine structure configured to manipulate a phase shift of sound waves that emanate from said speaker; and
a fire detection component comprising:
sensors; and
a controller that is configured to:
create a three-dimensional map of a space,
activate at least the speaker when a fire is detected to begin fire suppression,
locate a focal point, and
tune the metamaterial to the focal point;
wherein said metamaterial comprising said labyrinthine structure is configured to manipulate said phase shift at least by a surface shape of said metamaterial, and wherein said surface shape is modifiable to tune said phase shift,
wherein the metamaterial is comprised of a plurality of cells and each of the plurality of cells comprises said labyrinthine structure comprising walls and one or more prongs protruding from one or more of the walls.

2. The fire suppression apparatus of claim 1, wherein said metamaterial is configured to manipulate said phase shift in a manner that is substantially independent of internal composition of said metamaterial.

3. The fire suppression apparatus of claim 1, further comprising:
a speaker chamber configured to increase at least one decibel level of sound waves having at least one frequency,
wherein the speaker chamber comprises a substantially closed space encapsulating one end of the speaker, and
wherein the speaker chamber is at least partially sealed.

4. The fire suppression apparatus of claim 3, wherein a room is used as the speaker chamber, and wherein a geometry of said room is a factor in determining where to position the fire suppression apparatus to increase sound wave intensity within said room.

5. The fire suppression apparatus of claim 3, further comprising a rotating plate configured to continuously open and close the speaker chamber to enhance parts of a cycle of at least one of the sound waves.

6. The fire suppression apparatus of claim 1, further comprising:
a parabolic reflector that is located in a rear area of the speaker,
wherein the parabolic reflector is configured to channel sound waves through openings in said metamaterial.

7. The fire suppression apparatus of claim 1,
wherein location of the focal point is a factor in determining a decibel level output from the speaker and in determining frequency of sound wave output by the speaker.

8. The fire suppression apparatus of claim 7, wherein said fire detection component is configured to enable the fire suppression apparatus to distinguish an intended fire from an unintended fire.

9. The fire suppression apparatus of claim 1, wherein the sensors are configured to sense temperature, location, dimension, and movement of a fire.

10. The fire suppression apparatus of claim 9, wherein the controller is further configured to:
analyze data from said sensors, and
execute fire extinguishing procedures based at least partly on said data.

11. The fire suppression apparatus of claim 1, wherein the one or more prongs protrude perpendicularly from the one or more walls.

12. The fire suppression apparatus of claim 1, wherein edges where the one or more prongs connect with the one or more walls are chamfered.

13. The fire suppression apparatus of claim 1, further comprising:
a rounded bevel where the one or more prongs connect with the one or more walls.

14. The fire suppression apparatus of claim 1, wherein said labyrinthine structure further comprising two openings opposite one another.

15. A fire suppression system, comprising:
at least one speaker;
at least one metamaterial comprising a labyrinthine structure configured to manipulate a phase shift of sound waves that emanate from said at least one speaker; and
at least one fire detection component comprising:
sensors; and
a controller that is configured to:
create a three-dimensional map of a space,
activate at least the speaker when a fire is detected to begin fire suppression,
locate a focal point, and
tune the metamaterial to the focal point;
wherein said metamaterial comprising said labyrinthine structure is configured to manipulate said phase shift at least by a surface shape of said metamaterial, and wherein said shape is modifiable to tune said phase shift,
wherein the metamaterial is comprised of a plurality of cells and each of the plurality of cells comprises said labyrinthine structure comprising walls and one or more prongs protruding from one of the walls.

* * * * *